(12) United States Patent
Iio et al.

(10) Patent No.: US 6,279,615 B1
(45) Date of Patent: Aug. 28, 2001

(54) FUEL HOSE

(75) Inventors: Shinji Iio, Inazawa; Hiroaki Ito; Takahiro Nishiyama, both of Kasugai, all of (JP)

(73) Assignee: Tokai Rubber Industries, ltd., Komaki (JP)

( * ) Notice: Subject to any disclaimer, the term of this patent is extended or adjusted under 35 U.S.C. 154(b) by 0 days.

(21) Appl. No.: 09/653,199

(22) Filed: Aug. 31, 2000

(30) Foreign Application Priority Data

Sep. 3, 1999 (JP) .................................................. 11-250210
Sep. 3, 1999 (JP) .................................................. 11-250280

(51) Int. Cl.$^7$ .................................................. F16L 11/00
(52) U.S. Cl. .................. 138/137; 138/140; 138/141; 138/DIG. 7
(58) Field of Search ..................................... 138/141, 140, 138/137, DIG. 7, 145, 146

(56) References Cited

U.S. PATENT DOCUMENTS

| | | | |
|---|---|---|---|
| 5,469,892 | 11/1995 | Noone et al. | 138/121 |
| 5,488,975 | * 2/1996 | Chiles et al. | 138/125 |
| 5,560,398 | * 10/1996 | Pfleger | 138/121 |
| 5,588,468 | * 12/1996 | Pfleger | 138/121 |
| 6,089,278 | * 7/2000 | Nishino et al. | 138/137 |
| 6,170,535 | * 1/2001 | Sadr et al. | 138/137 |
| 6,194,040 | * 2/2001 | Delius et al. | 138/118.1 |

FOREIGN PATENT DOCUMENTS

| | | |
|---|---|---|
| 5-44874 | 2/1993 | (JP) . |
| 5-164273 | 6/1993 | (JP) . |
| 6-33031 | 2/1994 | (JP) . |
| 6-99548 | 4/1994 | (JP) . |
| 6-255004 | 9/1994 | (JP) . |
| 93/25835 | 12/1993 | (WO) . |
| 95/30105 | 11/1995 | (WO) . |

* cited by examiner

Primary Examiner—Patrick Brinson
(74) Attorney, Agent, or Firm—Jacobson Holman, PLLC

(57) ABSTRACT

A fuel hose comprises a single layered or multi-layered tubular rubber body and a thin film resin layer formed on the inner circumferential surface of the innermost layer of the tubular rubber body. The resin layer is formed of a resin such that an amount of permeation of 10% ethanol-mixed gasoline is 2 mg/cm$^2$/day (at 60° C.) or less when the thickness of the resin layer is 0.1 mm. A preferred example of such a resin is EVOH with an ethylene content of from 35 to 50 mol % or polybutylene aromatic ester. The fuel hose has necessary flexibility and shows excellent impermeability even to an alcohol-mixed gasoline.

19 Claims, 3 Drawing Sheets

FUEL HOSE

BACKGROUND OF THE INVENTION

1. Field of the Invention

This invention concerns a fuel hose mainly used for automobiles. More particularly, this invention relates to a fuel hose showing excellent impermeability to alcohol-mixed gasoline where methanol, ethanol, or the like is mixed. The fuel hose of this invention can also be used suitably as a pipeline for an alcohol fuel cell or a hydrogen fuel cell, for example, in automobiles.

2. Description of the Related Art

In recent years, there has been a demand for decreasing atmospheric release of gasoline in view of environmental problems. Therefore, regulations against permeation of gasoline have become more and more severe for fuel hoses for use in automobiles. Conventional single layered hoses composed of NBR/PVC cannot satisfy such regulations sufficiently.

In view of the above, it has been considered to provide a thin film of a resin layer on the innermost layer of a fuel hose. Resin materials have higher impermeability to gasoline than rubber materials. Further, when the resin layer is formed of a thin film, the flexibility of the fuel hose can be maintained. Specifically, it has been proposed to provide a thin film polyamide resin layer or a thin film fluororesin layer on the innermost layer of a fuel hose.

For instance, Japanese Patent Application Laid-Open No. 118549/1996 discloses laminating a tubular body of unvulcanized rubber of epichlorohydrin and an extruded fluororesin layer and adhering them by vulcanization. Japanese Patent Application Laid-Open No. 255004/1994 discloses electrostatically coating a powdery fluororesin to the inner circumferential surface of a tubular body of vulcanized rubber and then forming a fluororesin layer by heating and cooling. In the fuel hoses described above, more excellent impermeability than that of a single layered rubber hose can be expected for ordinary gasoline.

Recently, in view of the toxicity of MTBE (methyl tert-butyl ether) added to gasoline as an octane number improver, attention has been paid to the change to an alcohol-mixed gasoline. However, the alcohol-mixed gasoline has a rather high gasoline permeability not only to rubber materials, but also to resin materials. The reason is probably that when alcohol having low molecular weight selectively permeates, gasoline induced by the alcohol also permeates, resulting in the high gasoline permeability.

According to studies by the inventors, when a polyamide resin layer or a fluororesin layer is formed on the innermost layer, it is not easy to reduce the film thickness of the resin so as to ensure required flexibility of a fuel hose while simultaneously ensuring the sufficient impermeability to the alcohol-mixed gasoline.

In view of the regulations against fuel permeation expected to be enforced from the year of 2004 in the United States, there has been a strong demand for a fuel hose capable of conforming to severe regulations for impermeability to gasoline including alcohol-mixed gasoline.

SUMMARY OF THE INVENTION

Accordingly, an object of this invention is to provide a fuel hose having a thin film resin layer on the inner circumferential surface of a tubular rubber body, which can maintain necessary flexibility and show excellent impermeability to ordinary gasoline and alcohol-mixed gasoline.

Another object of this invention is to attain the foregoing object by improving a relatively rigid ethylene-vinyl alcohol copolymer into a soft structure and using the same as a material for the thin film resin layer.

A further object of this invention is to attain the foregoing object by improving a relatively rigid polybutylene aromatic ester resin into a soft structure and using the same as a material for the thin film resin layer.

A first aspect of this invention resides in a fuel hose comprising a single layered or multi-layered tubular rubber body and a thin film resin layer formed on the inner circumferential surface of the innermost layer of the tubular rubber body, wherein the resin layer is formed of a resin such that an amount of permeation of 10% ethanol-mixed gasoline is 2 mg/cm$^2$/day (at 60° C.) or less when the thickness of the resin layer is 0.1 mm.

The fuel hose according to the first aspect can provide both a satisfactory impermeability to an alcohol-mixed gasoline and a satisfactory hose flexibility owing to the thin film structure of the resin layer.

A second aspect of this invention resides in a fuel hose comprising a single layered or multi-layered tubular rubber body and a thin film resin layer formed on the inner circumferential surface of the innermost layer of the tubular rubber body, wherein the resin layer is formed of EVOH (ethylene-vinyl alcohol copolymer) with an ethylene content of 30 to 50 mol %.

It has been found that EVOH shows excellent gasoline-impermeability comparable with that of a fluororesin to ordinary gasoline and alcohol-mixed gasoline. In addition, the flexibility can be controlled by increasing or decreasing the ethylene content in EVOH.

In the second aspect, since the ethylene content of EVOH is defined within a range from 30 to 50 mol %, the flexibility of the resin layer and the gasoline impermeability are compatible in a well-balanced manner. Therefore, even when the resin layer is formed into such a thin film as not to deteriorate the flexibility of the hose, the impermeability to gasoline including alcohol-mixed gasoline is favorable. There will be a problem in the flexibility of the fuel hose if the ethylene content in EVOH is less than 30 mol % and in the impermeability to gasoline including alcohol-mixed gasoline if the ethylene content exceeds 50%.

A third aspect of this invention resides in a fuel hose comprising a single layered or multi-layered tubular rubber body and a thin film resin layer formed on the inner circumferential surface of the innermost layer of the tubular rubber body, wherein the resin layer is formed of a polybutylene aromatic ester.

It has been found that the polybutylene aromatic ester shows excellent impermeability to gasoline comparable with that of the fluororesin to ordinary gasoline and alcohol-mixed gasoline. In the third aspect of the invention, since the thin film resin layer is formed of a polybutylene aromatic ester, the flexibility required for the fuel hose can be ensured and the impermeability to gasoline including alcohol-mixed gasoline is favorable.

The above and other advantages of the invention will become more apparent from the following description and the accompanying drawings.

Figure 1:
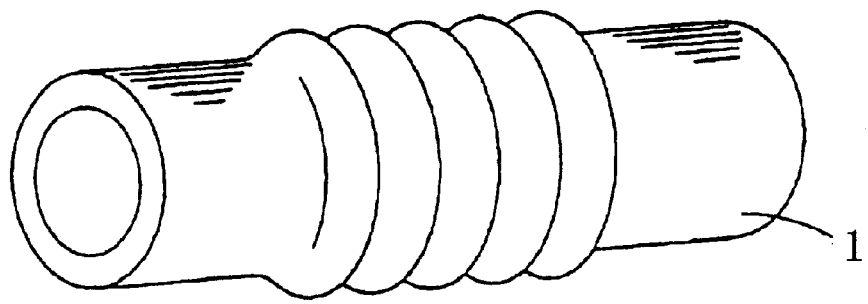
FIG. 1 is a perspective view showing an example of a tubular rubber body.

DETAILED DESCRIPTION OF THE INVENTION (Fuel Hose)

The fuel hose of this invention can be utilized as an impermeable type hose for transporting various kinds of fuels such as ordinary gasoline and alcohol-mixed gasoline. It is favorably used for automobiles for which the flexibility is required to moderate vibrations in running and engine vibrations and in view of assembling performance in an assembling process. Owing to its excellent impermeability to alcohol, it can be suitably used as a pipeline for an alcohol fuel cell of automobiles. Further, because of excellent impermeability to hydrogen, it is also suitably used as a hose for use in a hydrogen fuel cell of automobiles.

The fuel hose of this invention comprises at least a single layered or multi-layered tubular rubber body and a thin film resin layer formed on the inner circumferential surface of the innermost layer thereof. The hose may optionally include any other elements as far as they do not adversely affect the function or the effect of the invention. For example, an outer tubular rubber layer excellent in ozone resistance may be provided outside of the tubular rubber body. Further, a fiber-reinforced layer or a laminate layer containing a metal foil may be disposed between the layers of the multi-layered tubular rubber body.

Further, a fiber-reinforced layer or laminate layer may be disposed between the tubular rubber body and the outer rubber layer.

The fuel hose can be formed into any configuration in accordance with the purpose of use and, for instance, it may be formed as a so-called straight hose, a curved hose or a hose having a convolutional configuration at a portion thereof.

(Manufacture of Fuel Hose)

The method of manufacturing the fuel hose is not particularly restricted but the fuel hose shown in FIG. 1 can be manufactured, for example, by a preferred method shown below. The fuel hose in FIG. 1 has a thin film resin layer formed on the inner circumferential surface of a single layered tubular rubber body in which both ends are in the form of a straight tube and the middle portion is of a convolution or bellows-like configuration.

A rubber material for the tubular rubber body is blended with a vulcanizer, adhesion additives and other necessary blending agents. The rubber material is then injected into a mold having a cavity and a core corresponding to the shape of FIG. 1 by using an injection molding machine. The tubular rubber body 1 is manufactured by vulcanization under appropriate conditions. Then, a resin powder is deposited by powder coating to a portion of the inner circumferential surface of a tubular rubber body 1 except for both end portions to be connected with pipes. The powder coating is conducted by utilizing, for example, electrostatic charging of powder by friction between a spray gun and the powder, or electric fields formed by a spray gun connected to a voltage generator.

Then, the resin powder is melted under heating to form a thin film resin layer. The heating method can include, for example, heating the tubular rubber body 1 by placing the entire body in a heating oven, or inserting a rod-shaped heating device into a tubular rubber body 1 and heating the body from the inside. The heating condition is determined considering the melting temperature of the resin powder and the thermal degradation of rubber constituting the tubular rubber body 1. When the resin powder is EVOH, it is preferably heated at 180° to 220° C. for 15 to 45 min. When the resin powder is polybutylene aromatic ester, it is preferably heated at 230° to 260° C. for 15 to 45 min.

Figure 2A:
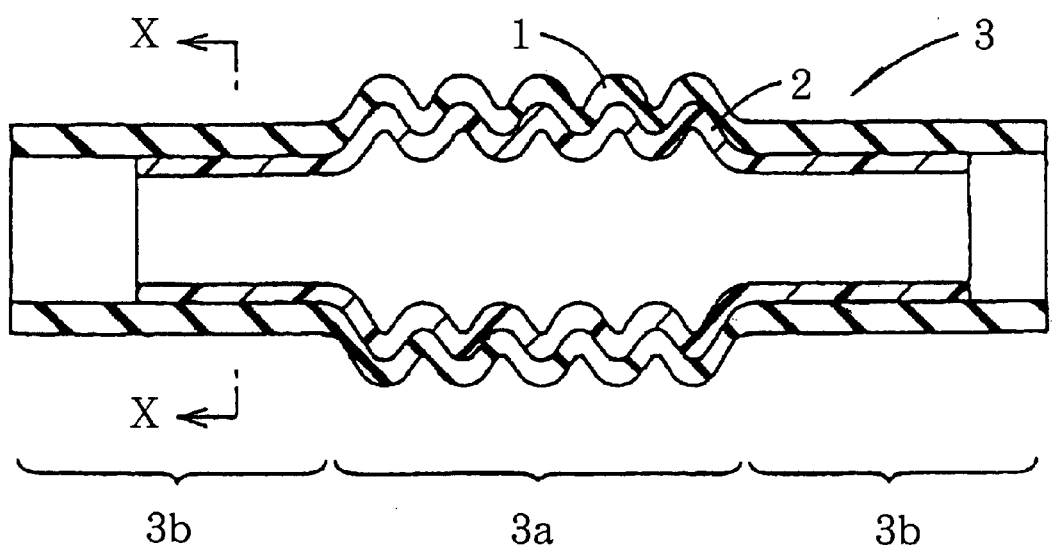
FIG. 2A is a cross-sectional view showing an example of a fuel hose according to this invention.
Figure 2B:
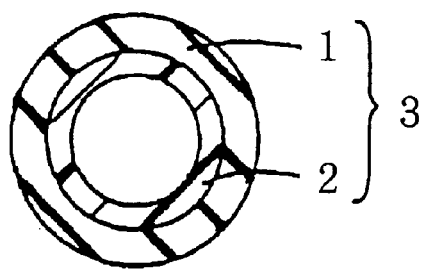
FIG. 2B is a cross-sectional view taken along line X—X in FIG. 2A.

After the heating, the tubular rubber body 1 is cooled to obtain a fuel hose 3 in which a thin film resin layer 2 is formed on the inner circumferential surface of the tubular rubber body 1 as shown in FIG. 2A and FIG. 2B.

Figure 3:
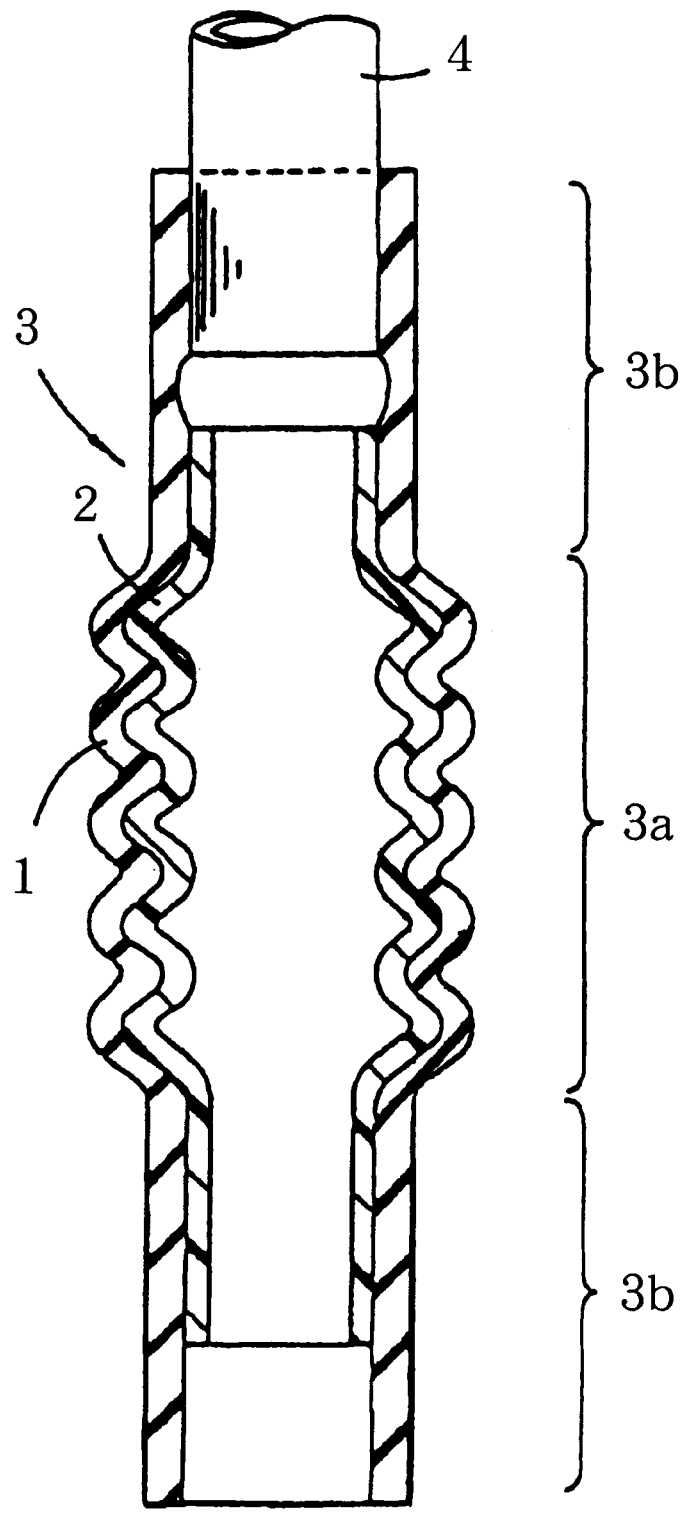
FIG. 3 is a cross-sectional view explaining the state of using a fuel hose according to this invention.

In each of the figures, the thickness of the thin film resin layer 2 is exaggerated for the sake of explanation. The fuel hose 3 can be used as a gasoline hose or an alcohol hose for a pipeline, for example, by inserting and connecting a mating metal pipe 4 to one end 3b thereof as shown in FIG. 3.

(Thin Film Resin Layer)

The resin usable for forming the thin film resin layer is such that the amount of permeation of 10% ethanol-mixed gasoline through the resin layer is 2 $mg/cm^2/day$ (at 60° C.) or less when the thickness of the resin layer is 0.1 mm. EVOH with an ethylene content of 30 to 50 mol % or polybutylene aromatic ester resin may be used. The kind of the polybutylene aromatic ester is not particularly restricted but PBN (polybutylene naphthalate) is particularly preferred. Further, PBN may be copolymerized with an etheric or esteric segment, mixed with other polymer or mixed with various kinds of additives to such an extent as not deteriorating the balance described above.

The thin film resin layer is formed on the inner circumferential surface of the innermost layer in the tubular rubber product of the fuel hose by using any one of the resins described above. The thin film resin layer can be formed by any method such as extrusion molding. Powder coating such as electrostatic coating is preferred for forming a smooth and defect free thin film resin layer. With the powder coating method, the thin film coating layer can be easily formed selectively on a specified portion of the inner circumferential surface excluding the pipe connection portion. When the thin film resin layer is formed over the entire inner circumferential surface of the fuel hose, an elastic material is coated on or inserted into a seal portion to ensure sealing of the pipe connection portion.

In forming a thin film resin layer by the powder coating method, it is desirable that the polybutylene aromatic ester resin is previously blended with a plasticizer to lower the melting point. This can lower the temperature in forming the film of the polybutylene aromatic ester resin by melting, for example, to as low as about 230° to 240° C., and thus can suppress thermal degradation of the tubular rubber body. It has been confirmed that the excellent gasoline impermeability of the polybutylene aromatic ester thin film layer is not impaired by the blending of the plasticizer since the plasticizer is released in forming the film.

There is no restriction on the kind and amount of the plasticizer blended with the polybutylene aromatic ester resin. Favorable examples include phthalate esters such as dimethyl phthalate, dibutyl phthalate and butyl benzyl phthalate, phosphate esters such as tricresyl phosphate and cresyl diphenyl phosphate, and sulfone amides such as toluene sulfone amide. The blending amount of the plasticizer is preferably from 5 to 30 parts by weight per 100 parts by weight of the polybutylene aromatic ester resin.

The thickness of the thin film resin layer is not restricted so far as it does not particularly deteriorate the flexibility of the fuel hose. It is preferably 0.5 mm or less and, more preferably, from 0.05 to 0.2 mm. If the thin film resin layer is excessively thick, the flexibility of the fuel hose may possibly be deteriorated. If the thin film resin layer is excessively thin, the gasoline impermeability tends to become insufficient, and the formation of the film may be insufficient even by the electrostatic coating method or the like to possibly cause defects such as pinholes.

(Tubular Rubber Body)

The tubular rubber body comprises a single layered or multi-layered rubber layer and, as described above, other layers such as a laminate layer, a fiber-reinforced layer and an outer tubular rubber layer may be present between the layers or outside the tubular wall. There is no particular restriction for the laminate layer, fiber-reinforced layer or outer tubular rubber layer.

While the kind of the rubber material layers constituting the tubular rubber body is not restricted, the innermost layer, that is, the layer in contact with the thin film resin layer is preferably formed of epichlorohydrin rubber (ECO, GECO), acrylonitrile butadiene rubber (NBR), fluororubber (FKM), acrylonitrile butadiene-polyvinyl chloride blend rubber (NBR/PVC), chlorosulfonated polyethylene rubber (CSM), chlorinated polyethylene rubber (CM), ethylene-propylene rubber (EPM, EPDM), NBR/EPDM, acrylic rubber (ACM) or urethane rubber (U). By the use of the rubber material described above, the flexibility and the gasoline resistance/gasoline impermeability of the entire hose can be maintained satisfactorily.

The tubular rubber body is preferably bonded to the thin film resin layer and, for improving the bonding, an adhesion additive can be blended in the rubber layer or the kind of the vulcanizer for rubber can be selected properly. Examples of the adhesion additive include phenol resin, resorcine resin, urethane resin, carboxyl group-containing polymer, maleic acid modified polymer and oligomer, carbodiimide group-containing polymer and oligomer, fatty acid amide and isocyanate.

EMBODIMENTS

First Example (Manufacture of Fuel Hose)

In the same manner as explained for FIG. 1 to FIG. 3, fuel hoses of Examples 1 to 3 and Comparative Examples 1 to 4 in Table 1 were manufactured. Each has an identical tubular rubber body and a thin film resin layer of a different material.

Specifically, by using unvulcanized rubber compositions in which predetermined vulcanizers, adhesion agents or necessary additives such as carbon black were added to unvulcanized NBR/PVC, tubular rubber bodies were vulcanized/molded by injection molding under the conditions at 160° C. for 5 minutes. The tubular rubber body had a convolutional structure at a middle portion, and had a wall thickness of 4 mm, an inner diameter of 35 mm at a straight tube portion and a length of 200 mm.

Then, the resin powder of the type shown in each of the examples in Table 1 was deposited on a predetermined portion of the inner circumferential surface of the tubular rubber body by electrostatic coating utilizing corona discharging minus charges (triboelectric charging for Comparative Example 2). The deposited thickness was 0.1 mm for each of the examples. Then, it was melted to form a film by heating at 210° C. for 25 minutes. In Table 1, "copolymerization ratio" indicated, for example, as "32/68" for "EVOH" means that EVOH powder with an ethylene content of 32 mol % was used. Further, "VDF/CTFE" indicates that a fluororesin powder comprising a copolymer of vinylidene fluoride and chlorotrifluoro ethylene was used.

(Evaluation of Films Formed)

The fuel hose in each of the examples described above was longitudinally bisected and the state of the thin film resin layer formed on the inner circumferential surface of the tubular rubber body was evaluated by observation with naked eyes. The results are shown in Table 1 as "◯" (smooth film is formed) or "×" (grains of resin left).

(Evaluation of Flexibility of Fuel Hose)

The fuel hose of 200 mm length in each of the examples described above was fixed at one end and a weight (N) was measured when the other end of the hose was displaced by 200 mm in the direction orthogonal to the axial direction of the hose. The result is indicated in Table 1 as "◯" (load was 700 N or less) or "×" (load exceeded 700N).

(Evaluation of Fuel Impermeability of Fuel Hose)

Three kinds of test gasoline were prepared, namely, "Fuel C" according to JIS K 6258, "E 10" as an ethanol/gasoline (fuel C) mixture in the mixing ratio of 10:90 (volume) and "M15" as a methanol/gasoline (fuel C) mixture in the mixing ratio of 15:85 (volume). They were sealed in the hose in each of the examples and left at 60° C. for 168 hours.

Subsequently, after replacing the content with an identical fresh gasoline, they were further left at 60° C. for 72 hours. The fuel permeation amount (g) per one day per one fuel hose was calculated based on the change of the weight before and after leaving each example for 72 hours and the results are shown in Table 1.

TABLE 1

|  |  | Example 1 | | | Comparative Example | | | |
|---|---|---|---|---|---|---|---|---|
|  |  | 1 | 2 | 3 | 1 | 2 | 3 | 4 |
| Resin | Kind | EVOH | EVOH | EVOH | VDF/CTFE | Nylon 11 | EVOH | EVOH |
|  | Copolymerization ratio | 32/68 | 44/56 | 50/50 | 95/5 | 60/40 | 20/80 |  |
|  | Permeability | 1.2 | 1.7 | 1.9 | 2.9 | 34.7 | 2.7 | 1.0 |
| Film formed |  | ◯ | ◯ | ◯ | ◯ | ◯ | ◯ | ◯ |
| Flexibility |  | ◯ | ◯ | ◯ | ◯ | ◯ | ◯ | X |
| Fuel impermeability (g/hose/day) | Fuel C | 0.09 | 0.11 | 0.13 | 0.40 | 0.63 | 0.15 | 0.07 |
|  | E 10 | 0.53 | 0.75 | 0.89 | 1.29 | 15.4 | 1.2 | 0.44 |
|  | M 15 | 4.9 | 5.3 | 5.7 | 5.6 | 42 | 6.5 | 4.4 |

(Evaluation of Fuel Impermeability of Thin Film Resin Layer)

Sample films having a thickness of 0.1 mm were prepared using materials for thin film resin layers in the Examples shown in Tables 1 to 4. These sample films were tested for fuel impermeability according to a CUP method.

Figure 4:
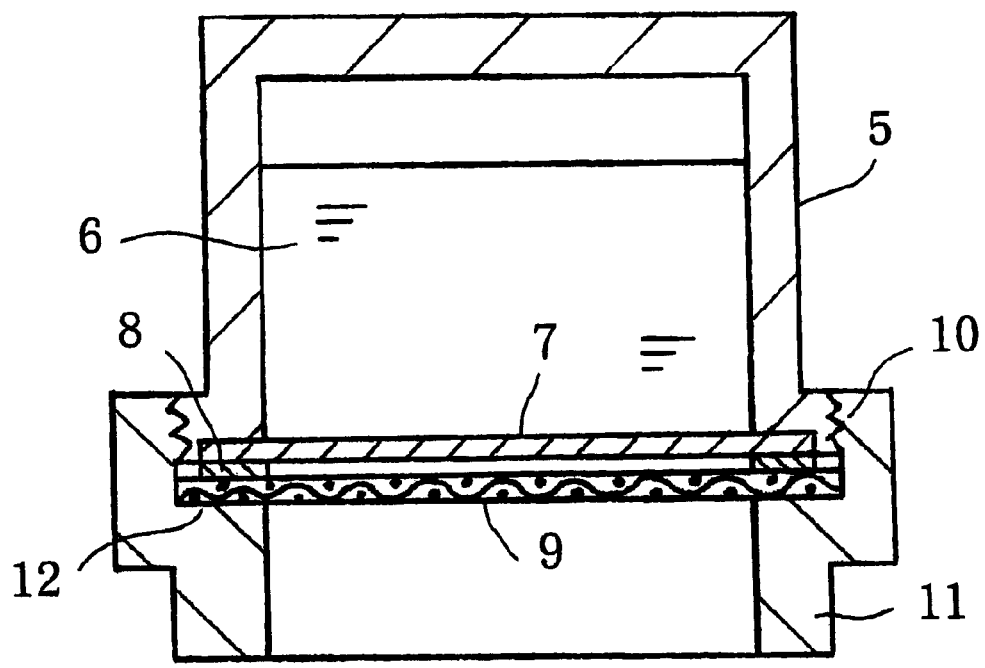
FIG. 4 is a schematic view showing a method of fuel impermeability evaluation employed herein.

The method is described concretely with reference to FIG. 4. A cup 5 having an external thread around its outer periphery was set with its opening upward (i.e. opposite to its situation illustrated), and 100 ml of ethanol/gasoline (fuel C) mixture in the mixing ratio of 10:90 (volume) was poured into it. The opening of the cup 5 was covered with the sample film 7 through rubber packing (not shown), and a metal ring 8 for getting the seal was laid over the sample film along its periphery. A metal mesh 9 for supporting the sample film was laid over it. Then, a fastening cap 11 having an internal thread 10 around its inner periphery was screwed over the opening of the cup 5. Accordingly, the metal mesh 9, the metal ring 8 and the sample film were tightly pressed against the periphery of the opening of the cup 5 at the step 12, and the opening of the cup 5 was completely sealed. The test equipment was then turned upside down and kept in an oven at a constant temperature of 60° C.

For evaluation, the content was replaced with an identical fresh 10% ethanol-mixed gasoline every week, and the weight of the cup was measured every day for four weeks. The relationship between the lapse of time (hours) and the reduction in weight of the cup, i.e. the amount (mg) of the fuel permeated was plotted in a graph. Then the amount of permeation (mg/cm$^2$/day) was calculated for each thin film resin layer based on the data when the change in the graph became constant. The results are shown at "Permeability (of Resin)" in Tables 1 and 3.

Second Example

In the same manner as in the first example, fuel hoses of Examples 4 to 10 in Table 2 each having the tubular rubber body formed of a different material and the identical thin film resin layer were manufactured. Specifically, the rubber materials shown in Table 2 were used for the tubular rubber body, and each of the thin film resin layers was the same as in Example 1 above. Then, the evaluations of the films formed, the flexibility and the fuel impermeability were conducted for the fuel hose in each of the examples in the same manner as in the first example. The results are shown in Table 2 in the same manner as those in Table 1.

same manner as explained for FIG. 1 to FIG. 3. In the third example, previous blending of the plasticizer with the material of the thin film resin layer for lowering the melting point of the resin was not conducted.

TABLE 3

|  |  | Example | Comparative Example | |
|---|---|---|---|---|
|  |  | 11 | 5 | 6 |
| Resin | Kind | PBN | VDF/CTFE | Nylon 11 |
|  | Copolymerization ratio |  | 95/5 |  |
|  | Permeability | 1.2 | 2.9 | 34.7 |
| Film formed |  | ○ | ○ | ○ |
| Flexibility |  | ○ | ○ | ○ |
| Fuel | Fuel C | 0.10 | 0.40 | 0.63 |
| impermeability | E 10 | 0.56 | 1.29 | 15.4 |
| (g/hose/day) | M 15 | 0.13 | 5.8 | 42 |

Specifically, by using unvulcanized rubber compositions in which predetermined vulcanizers, adhesion agents or necessary additives such as carbon black were added to unvulcanized NBR/PVC tubular rubber bodies were vulcanized/molded by injection molding at 160° C. for 5 minutes. The tubular rubber body had a convolutional structure at a middle portion, and had a wall thickness of 4 mm, an inner diameter of 35 mm at a straight tube portion and a length of 200 mm.

Then, the resin powder shown in each of the examples in Table 3 was deposited on a predetermined portion of the inner circumferential surface of the tubular rubber body by electrostatic coating utilizing corona discharging minus charges (by triboelectric charging for Comparative Example 6). The deposited thickness was 0.1 mm for each of the examples. Then, they were melted to form films by heating at 255° C. for 25 minutes in Example 11 and at 210° C. for 25 minutes in Comparative Examples 5 and 6. In Table 3, "VDF/CTFE" indicates that a fluororesin powder comprising a copolymer of vinylidene fluoride and chlorotrifluoro ethylene was used. In Table 3, "95/5" for "copolymerization ratio" indicates that the monomer ratio of vinylidene fluoride to chlorotrifluoroethylene in the copolymer is 95:5.

(Evaluation of Films Formed)

The fuel hose in each of the examples described above was longitudinally bisected and the state of the thin film resin layer formed on the inner circumferential surface of the tubular rubber body was evaluated by observation with naked eyes. The results are shown in Table 3 as "○" (smooth film is formed) or "×" (grains of resin left).

TABLE 2

|  |  | Example | | | | | | |
|---|---|---|---|---|---|---|---|---|
|  |  | 4 | 5 | 6 | 7 | 8 | 9 | 10 |
| Rubber material |  | Hydrin rubber | Acrylic rubber | NBR/ EPDM | EPDM rubber | CSM | Chlorinated PE rubber | Urethane rubber |
| Film formed |  | ○ | ○ | ○ | ○ | ○ | ○ | ○ |
| Flexibility |  | ○ | ○ | ○ | ○ | ○ | ○ | ○ |
| Fuel | Fuel C | 0.09 | 0.09 | 0.10 | 0.10 | 0.10 | 0.10 | 0.09 |
| impermeability | E 10 | 0.55 | 0.55 | 0.55 | 0.56 | 0.55 | 0.56 | 0.55 |
| (g/hose/day) | M15 | 4.7 | 5.0 | 4.9 | 4.9 | 4.8 | 4.8 | 4.8 |

Third Example (Manufacture of Fuel Hose)

Fuel hoses in Example 11, and Comparative Examples 5 and 6 in Table 3 each having an identical tubular rubber body and a different thin film resin layer were manufactured in the (Evaluation of Flexibility of Fuel Hose) The fuel hose of 200 mm length in each of the examples described above was fixed at one end and a weight (N) was measured when the other end of the hose was displaced by 200 mm in the direction orthogonal to the axial direction of the hose. The results are indicated in Table 3 as "○" (load was 700 N or less) or "×" (load exceeded 700N).
(Evaluation of Fuel Impermeability of Fuel Hose)

Three kinds of test gasoline were prepared, namely, "Fuel C" according to JIS K 6258, "E 10" as an ethanol/gasoline (fuel C) mixture in the mixing ratio of 10:90 (volume) and "M15" as a methanol/gasoline (fuel C) mixture in the mixing ratio of 15:85 (volume). They were sealed in the hose in each of the examples and left at 60° C. for 168 hours. Subsequently, after replacing the content with an identical fresh gasoline, they were further left at 60° C. for 72 hours. The fuel permeation amount (g) per one day per one fuel hose was calculated based on the change of the weight before and after leaving each example for 72 hours and the results are shown in Table 3.

TABLE 4

| | | Example | | | | | | | |
|---|---|---|---|---|---|---|---|---|---|
| | | 11 | 12 | 13 | 14 | 15 | 16 | 17 | 18 |
| Rubber material | | NBR/PVC | Hydrin rubber | Acrylic rubber | NBR/EPDM | EPDM rubber | CSM | CM | Urethane rubber |
| Film formed | | ○ | ○ | ○ | ○ | ○ | ○ | ○ | |
| Flexibility | | ○ | ○ | ○ | ○ | ○ | ○ | ○ | ○ |
| Fuel impermeability (g/hose/day) | Fuel C | 0.10 | 0.10 | 0.10 | 0.10 | 0.11 | 0.11 | 0.11 | 0.10 |
| | E 10 | 0.56 | 0.56 | 0.56 | 0.56 | 0.56 | 0.56 | 0.56 | 0.55 |
| | M 15 | 0.13 | 0#14 | 0.13 | 0.12 | 0.12 | 0.14 | 0.11 | 0.12 |

Fourth Example

In the same manner as in the third example, fuel hoses of Example 11 (identical with Example 11 in the third example) to Example 18 in Table 4 each having the tubular rubber body of a different material and having the identical thin film resin layer were manufactured. Specifically, the rubber materials in Table 4 were used as the materials for the tubular rubber bodies, and each of the thin film resin layers was the same as in Example 11.

Then, the evaluations of films formed, the flexibility and the fuel impermeability were conducted for the fuel hose in each of the examples in the same manner as in the third example. The results are shown in Table 4.

While the preferred embodiments have been described, variations thereto will occur to those skilled in the art within the scope of the present inventive concepts which are delineated by the following claims.

What is claimed is:

1. A fuel hose comprising a single layered or multi-layered tubular rubber body and a thin film resin layer formed on the inner circumferential surface of an innermost layer of the tubular rubber body, wherein the resin layer is formed of a resin such that an amount of permeation of 10% ethanol-mixed gasoline is 2 mg/cm²/day (at 60° C.) or less when the thickness of the resin layer is 0.1 mm.

2. A fuel hose comprising a single layered or multi-layered tubular rubber body and a thin film resin layer formed on the inner circumferential surface of an innermost layer of the tubular rubber body, wherein the resin layer is formed of EVOH with an ethylene content of from 30 to 50 mol %.

3. The fuel hose as claimed in claim 2, wherein the thickness of the thin film resin layer is 0.5 mm or less.

4. The fuel hose as claimed in claim 2, wherein the thickness of the thin film resin layer is from 0.05 to 0.2 mm.

5. The fuel hose as claimed in claim 2, wherein the thin film resin layer is formed by depositing and melting a powder of EVOH on the inner circumferential surface of the innermost layer of the tubular rubber body.

6. The fuel hose as claimed in claim 2, wherein at least the innermost layer of the tubular rubber body is formed of ECO, GECO, NBR, FKM, NBR/PVC, CSM, CM, EPM, EPDM, NBR/EPDM, ACM or U.

7. The fuel hose as claimed in claim 2, wherein the fuel hose has a straight tube configuration, a curved tube configuration or a tube configuration having a convolutional or bellows-like configuration at portion thereof.

8. The fuel hose as claimed in claim 2, wherein the fuel hose include at least one of a fiber-reinforced layer, a metal foil laminate layer and an outer tubular rubber layer outside of the tubular rubber body.

9. A fuel hose comprising a single layered or multi-layered tubular rubber body and a thin film resin layer formed on the inner circumferential surface of an innermost layer of the tubular rubber body, wherein the resin layer is formed of a polybutylene aromatic ester.

10. The fuel hose as claimed in claim 9, wherein the thin film resin layer is formed by depositing and melting a powder of a polybutylene aromatic ester on the inner circumferential surface of the innermost layer of the tubular rubber body.

11. The fuel hose as claimed in claim 9, wherein the powder of the polybutylene aromatic ester is previously blended with a plasticizer to lower the melting point.

12. The fuel hose as claimed in claim 11, wherein the plasticizer is a phthalate ester, a phosphate ester or a sulfone amide type plasticizer.

13. The fuel hose as claimed in claim 11, wherein the plasticizer is blended in amount of 5 to 30 parts by weight per 100 parts by weight of the polybutylene aromatic ester.

14. The fuel hose as claimed in claim 9, wherein the polybutylene aromatic ester is polybutylene naphthalate (PBN).

15. The fuel hose as claimed in claim 9, wherein the thickness of the thin film resin layer is 0.5 mm or less.

16. The fuel hose as claimed in claim 9, wherein the thickness of the thin film resin layer is from 0.05 mm to 0.2 mm.

17. The fuel hose as claimed in claim 9, wherein at least the innermost layer of the tubular rubber body is formed of ECO, GECO, NBR, FKM, NBR/PVC, CSM, CM, EPM, EPDM, NBR/EPDM, ACM or U.

18. The fuel hose as claimed in claim 9, wherein the fuel hose has a straight tube configuration, a bent tube configuration or a tube configuration having a convolutional or bellows-like configuration at a portion thereof.

19. The fuel hose as claimed in claim 9, wherein the fuel hose includes at least one layer of a fiber-reinforced layer, a metal foil laminate layer and an outer tubular rubber layer outside of the tubular rubber body.

* * * * *